April 17, 1956        R. A. MORSE ET AL        2,742,089
SECONDARY RECOVERY
Filed Dec. 29, 1950
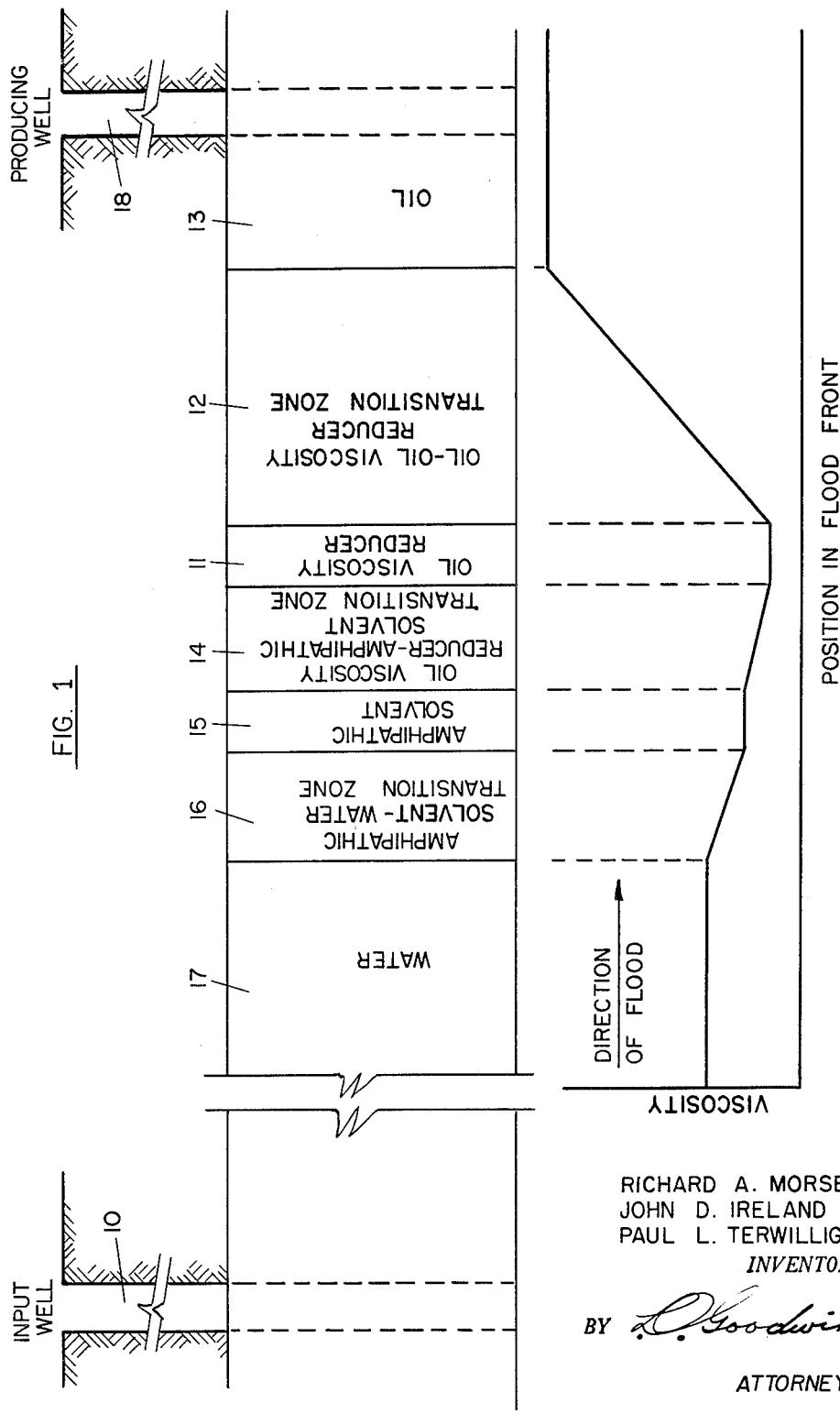
RICHARD A. MORSE
JOHN D. IRELAND
PAUL L. TERWILLIGER
*INVENTORS*
BY 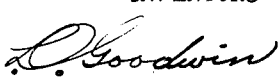
*ATTORNEY*

United States Patent Office 2,742,089
Registered Apr. 17, 1956

2,742,089

SECONDARY RECOVERY

Richard A. Morse, John D. Ireland, and Paul L. Terwilliger, Tulsa, Okla., assignors to Stanolind Oil and Gas Company, Tulsa, Okla., a corporation of Delaware Application December 29, 1950, Serial No. 203,422

13 Claims. (Cl. 166—9)

This invention pertains to an improved method for recovering oil from an underground reservoir. More particularly, this invention is directed to an improved secondary recovery process for economically displacing substantially all of the oil from an underground oil reservoir.

In a copending application, S. N. 176,168, filed July 27, 1950, a method has been disclosed for increasing the recovery of oil from a subterranean petroleum reservoir by displacing the oil with an oil-miscible liquid and then displacing the oil-miscible liquid with a cheap scavenging fluid which may be lift in the reservoir or, in some cases, recovered. In that process various solvents which are both water- and oil-miscible, when disposed between the oil and the water, will prevent the water flood from by-passing oil in the reservoir and, thus, permit the oil to be substantially completely removed from the reservoir. Any of a number of such solvents—for example, acetone, isopropyl alcohol, and the like—will accomplish this result. Such solvents, which are hereinafter referred to as amphipathic solvents, are, however, practically always more expensive than the oil which they displace. Furthermore, since these solvents are miscible with water, they cannot be recovered without processing the flood water or scavenging fluid used to drive the oil through the reservoir. Since the amount of solvent required may be as great as about 10% or more of the volume of oil in place at the commencement of a secondary recovery operation, use of an amphipathic solvent cannot always be economically justified.

It is an object of this invention to provide an improved process for the recovery of petroleum hydrocarbons from an underground reservoir. A further object of this invention is to provide an improved process for substantially completely recovering the oil from an oil-producing reservoir. A still more specific object of this invention is to provide an economical process for displacing the oil from a reservoir by employing miscible fluid displacement. Additional objects of this invention will become apparent from the following description in which reference will be made to the accompanying drawings. In these drawings:

Figure 1 is a diagrammatic representation of a cross section of a reservoir between an input and a producing well showing the various stages that develop at a flood front when oil is recovered from a reservoir by our process; and Figure 2 is a plot of the viscosity of the fluids at the various stages across the flood front shown in Figure 1.

We have now found that while the efficiency of displacement can be materially increased by interposing an amphipathic solvent ahead of the water flood, in some cases, particularly in reservoirs which produce relatively viscous oil, that process can be improved materially so that the oil remaining after completion of the primary recovery process can be recovered more economically. In this regard, we have discovered that, in the displacement of a driven liquid through a reservoir with a miscible driving liquid, the length of a mixing zone, after becoming stabilized, is dependent upon a number of factors. More particularly, we have found empirically that:

$$L_s = K(\bar{\mu})^{0.25}(V)^{0.75}(R_v)^{0.75}120$$

where:

$L_s$ = stabilized length in centimeters of the mixing zone between the driven and driving liquid;
$K$ = 2.2, a constant;
$\bar{\mu}$ = average viscosity in centipoises of the driven and driving liquids in the mixing zone;
$V$ = rate of advance in cm/day of the stabilized mixing zone; and
$R_v = \mu_1/\mu_2$ = ratio of viscosities of driven liquid to driving liquid.

From this equation it can be seen that the length of the mixing zone between the driven liquid and the driving liquid increases substantially as $\mu_1/\mu_2$ increases and as the average viscosity of the driven and driving liquids increase. For example, it can be shown from this equation that the length of the mixing zone between an oil having 5 centipoise viscosity and any given miscible driving liquid is more than five times the length of the mixing zone when an oil of 1 centipoise viscosity is displaced by the same miscible driving liquid. As the viscosity of the oil increases (and in some cases it may be as high as 10 centipoises or higher), the length of the mixing zone increases and, substantially proportionately, the amount of miscible solvent which must be used to assure complete displacement of the oil increases.

We have found that by changing the characteristics, particularly increasing the diffusivity of the driven and driving liquids, as by reducing the viscosity of the oil at the time the amphipathic solvent contacts the oil or otherwise increasing the miscibility of the oil and the solvent, the length of the mixing zone between the oil and the solvent can be substantially reduced. This change, in general, involves contacting the oil immediately ahead of the solvent with an oil-miscible fluid having a viscosity considerably lower than the viscosity of the oil and, preferably, also lower than the viscosity of water. Typical oil viscosity reducers are low-molecular-weight hydrocarbons, such as butane, propane, pentane, or mixtures thereof. A particularly desirable oil viscosity reducer of this type is a mixture of these hydrocarbons known commercially as liquefied petroleum gas and sometimes hereinafter referred to as L. P. G. These mixtures, as is well known, consist of hydrocarbons containing 2 to 6 carbon atoms per molecule, principally propane and butane with minor proportions of ethane, pentane, and possibly very minor proportions of methane, and hexane and heavier hydrocarbons. Other suitable oil viscosity reducers are natural gasoline or narrow cuts of refined light petroleum hydrocarbons, such as gasoline, kerosene, naphtha, or the like. Carbon tetrachloride, carbon disulfide, chlorinated hydrocarbons, and other well-known oil viscosity reducers are also contemplated. Mixtures of these materials are sometimes desirable.

Referring now to Figure 1, this oil viscosity reducer is first injected into the input well 10 under a pressure above its vapor pressure, producing a band 11 of oil viscosity reducer. In the case of radial flow, such as in a "five-spot" pattern, this band is in the form of a ring substantially concentric with the input well. In the case of the so-called "shoe string" reservoirs, this band may be merely a short section which extends across the reservoir. Shortly after the oil viscosity reducer is injected into the input well, being miscible with the oil in the reservoir, an oil-oil viscosity reducer transition zone 12 develops between the oil zone 13 and the oil viscosity reducer band 11. The length of this transition zone, as indicated in the above equation, varies, depending upon a number of factors. As shown in more detail hereinafter, the length of this zone is deliberately made relatively great, since oil viscosity reducers—particularly L. P. G.—are much less expensive than the amphipathic solvents which follow, and since the amount of amphipathic solvent may, within limits, be decreased as the amount of oil viscosity reducer is increased. The amount of oil viscosity reducer injected into the input well may vary, depending upon its viscosity, the initial viscosity of the oil, and the viscosity of the oil when diluted with the oil viscosity reducer. It is particularly desirable that the liquid in the trailing edge of the oil-oil viscosity reducer transition zone 12 have a viscosity below the viscosity of the amphipathic solvent. Thus, in the case of L. P. G., which is relatively inexpensive, and which can be recovered with the oil and easily separated from the commercially valuable hydocarbons in the oil by common refining practices, the amount of oil viscosity reducer injected into the input well may be relatively great without economically defeating a secondary recovery operation. Accordingly, we generally prefer to inject L. P. G. into a reservoir in an amount equal to between about 5% and about 10%, or more, of the pore volume of the reservoir, i. e., sufficient L. P. G. to provide an excess and produce a zone of pure L. P. G. behind the transition zone.

After a suitable amount of oil viscosity reducer has been injected into the input well, it is followed directly by an amphipathic solvent. The viscosity of L. P. G. being quite low, between about 0.07 and about 0.15 centipoise at reservoir conditions, it will be apparent that many amphipathic solvents which have a higher viscosity can be found. As indicated above, $L_s$ decreases as the ratio $\mu_1/\mu_2$ decreases. It is therefore generally desirable to displace any liquid in a reservoir with a more viscous liquid. As indicated by Figure 2, which shows the relationship between viscosity and position in the flood front shown in Figure 1, the oil viscosity is decreased by the addition of an oil viscosity reducer, such as L. P. G., to a viscosity lower than the viscosity of the amphipathic solvent. Suitable solvents of this class may be any of a number of solvents which are preferably completely miscible with water, the oil viscosity reducer and the oil having its viscosity reduced substantially by the oil viscosity reducer. Examples are: acetone, butyl cellosolve, butylamine, dioxane, and intermediate alcohols, such as ethyl, normal and isopropyl, diacetone, butyl carbitol, 1-dimethylamino-2-propyl, 1-methoxy-2-propyl, and allyl alcohol. This amphipathic solvent should, as indicated above, have a viscosity higher than the liquid it drives, and it should, in addition, have a viscosity lower than the scavenging water used to displace it through the reservoir. The preferred amphipathic solvents are acetone and alcohols having less than about 4 carbon atoms to the molecule—e. g. isopropanol and ethanol. Solvents which are partially but not completely miscible with both the water and the low-viscosity oil, such as acetylacetone, amyl hydrate, 1- and 2-butanol diethylene glycol, dimethyl dioxane, dioxolane, and the like, may be used to advantage in some cases.

This solvent is injected into the input well and, being miscible with the oil viscosity reducer, immediately forms with the excess oil viscosity reducer an oil viscosity reducer-amphipathic solvent transition zone 14. If sufficient amphipathic solvent is injected, it produces a pure amphipathic solvent band 15. As indicated by Figure 2, the viscosity of the amphipathic solvent being greater than the viscosity of the viscosity reducer, the viscosity of the mixture in the transition zone gradually increases from the viscosity of the oil viscosity reducer to the viscosity of the amphipathic solvent. While this is shown, for simplicity, as a straight line, there is substantial evidence that the major change in viscosity occurs at the leading edge of the transition zone. The amphipathic solvent being the driving liquid and being more viscous than the driven liquid, in accordance with the above equation, the transition zone 14 is relatively short. This transition zone, when stabilized, appears to be as short as about 1–5 feet or less, so that a relatively small amount of amphipathic solvent is required in order to provide an excess and produce a pure amphipathic solvent band 15. In general, between about 0.5% and 1% of the pore volume of the reservoir is all the solvent required to produce a substantial excess where the spacing between input and producing wells is as great as about 660 feet. In some cases, the amphipathic solvent may be diluted with water or oil to reduce the amount of solvent required. The amount of dilution possible depends upon the solubilities of the components in each other. It is desirable to dilute as much as possible without producing two phases. This amount can be determined readily by bottle tests at the surface. After the required amount of amphipathic solvent has been injected into the input well, it is displaced through the formation by injecting water into the input well. The amphipathic solvent and water, either fresh or salt water, being miscible, produce an amphipathic solvent-water transition zone 16 between the amphipathic solvent band 15 and the water zone 17. This transition zone, as indicated in Figure 2, is also relatively short, since the amphipathic solvent is miscible with the water and since it is preferably less viscous than the water.

The continued injection of water into the input well displaces the flood front across the reservoir—a desirable rate of advance being between about 0.1 and 2 feet per day. The oil viscosity reducer, being immiscible with the connate water in the reservoir, displaces only a small amount of the connate water from the reservoir at the leading edge of the flood. The remaining connate water, which is generally that remaining in the smallest pores, is then displaced or driven by the amphipathic solvent, with which it is miscible. The displaced oil and water are driven to the producing well or wells 18 by the continued injection of water. The oil arrives at the producing well first and, together with some water, is produced by flowing, pumping, or the like. Following the production of substantially pure oil, there follows in sequence a period in which oil diluted with the oil viscosity reducer is produced, and eventually substantially pure oil-viscosity reducer and water are produced. Production beyond this period is sometimes desirable, so that the liquid in the oil viscosity reducer-amphipathic solvent transition zone 14 and the liquid in the pure amphipathic solvent band 15 may be recovered. Where separation of the amphipathic solvent from the water is not economically justified, production of the reservoir is discontinued at about the time the amphipathic solvent-water transition zone 16 reaches the producing well. The reservoir is thus left substantially full of water. In some cases, it may be desirable to increase artificially the viscosity of the scavenging water, particularly at the leading edge, so that the amphipathic solvent-water transition zone 16 may be shortened. The viscosity of the water may be increased by adding crystalline materials, such as sugar or the like.

From the foregoing it will be apparent that this invention is susceptible of a great variety of embodiments. Such embodiments and modifications as may be construed to fall within the scope and meaning of the appended claims are also considered to be within the spirit and intent of the invention.

We claim:

1. A method of recovering oil from a subterranean oil reservoir comprising the steps of injecting into said reservoir through an input well a quantity of L. P. G. to reduce the viscosity of said oil, and subsequently displacing said oil of reduced viscosity through said reservoir to a producing well by injecting water into said reservoir through said input well, said oil and said water being separated by injecting an amphipathic solvent into said reservoir through said input well to prevent said water from by-passing said oil in said reservoir, said amphipathic solvent being injected into said reservoir between the steps of injecting L. P. G. and injecting water.

2. A method according to claim 1 in which the quantity of said L. P. G. is equal to between about 5% and about 10% of the effective pore volume of said reservoir.

3. A method according to claim 1 in which the quantity of said L. P. G. is equal to between about 5% and about 10% of the effective pore volume of said reservoir, and the quantity of said amphipathic solvent is between about 0.5% and 1% of the pore volume of said reservoir.

4. A method according to claim 1 in which said L. P. G. is injected into said reservoir at a pressure greater than the vapor pressure of said L. P. G.

5. A method according to claim 1 in which said amphipathic solvent has a viscosity higher than the viscosity of said L. P. G.

6. A method according to claim 1 in which the viscosity of said solvent is higher than the viscosity of L. P. G. and lower than water.

7. A method according to claim 1 in which said amphipathic solvent is acetone.

8. A method according to claim 1 in which said amphipathic solvent is an alcohol having less than 4 carbon atoms to the molecule.

9. A method according to claim 8 in which said alcohol is isopropanol.

10. A method according to claim 8 in which said alcohol is ethanol.

11. A method of recovering oil from a subterranean oil reservoir having an injection well and a producing well comprising the steps of injecting a hydrocarbon liquid having between about 2 and about 6 carbon atoms to the molecule into said reservoir through said injection well, thereafter injecting into said reservoir through said injection well an amphipathic solvent and then injecting water into said reservoir through said injection well to displace said amphipathic solvent through said reservoir to said producing well, whereby said oil in said reservoir is displaced to said producing well.

12. A method according to claim 11 in which said hydrocarbon liquid is L. P. G.

13. In the injection of a stream of water through an injection well into a porous subsurface formation wet by water containing a non-wetting crude oil phase which is resistant to displacement and substantially restricts the permeability of the formation to water, the steps of forcing into the formation from the well bore a liquid solvent for the crude phase which is substantially immiscible with water, continuing the injection of said non-wetting solvent to dissolve the crude oil phase in a predetermined region about the well bore, form a continuous phase with the crude oil phase and displace the resulting solution substantially beyond said region in a radial direction from the well bore, thereafter terminating the injection of the said first named solvent and injecting from the well bore into the formation a second solvent which is mutually solvent to water and to the non-wetting phase in the formation, continuing the injection of the second solvent to form in said region a continuous phase of said second solvent with the first named solvent dissolved therein, injecting additional second solvent to force the continuous phase a substantial distance radially beyond said region thereby substantially saturating the region about the bore with said second solvent, and thereafter injecting water to displace said second solvent and saturate said formation with water and continuing said water injection at a substantially increased permeability.

References Cited in the file of this patent
UNITED STATES PATENTS

| | | |
|---|---|---|
| 1,101,605 | Wright | June 30, 1914 |
| 1,978,655 | Straight | Oct. 30, 1934 |
| 2,135,319 | Bays | Nov. 1, 1938 |
| 2,265,923 | Normand | Dec. 9, 1941 |
| 2,341,500 | Detling | Feb. 8, 1944 |
| 2,345,713 | Moore et al. | Apr. 4, 1944 |
| 2,347,769 | Crites | May 2, 1944 |
| 2,412,765 | Buddrus et al. | Dec. 17, 1946 |